(No Model.) 9 Sheets—Sheet 1.
C. WHITAKER.
CONE RACK ACTUATING MECHANISM FOR FLY FRAMES.
No. 554,408. Patented Feb. 11, 1896.

WITNESSES.
Mary Caverly.
Sam! G. Stephens.

INVENTOR.
Channing Whitaker.

(No Model.)  9 Sheets—Sheet 4.
C. WHITAKER.
CONE RACK ACTUATING MECHANISM FOR FLY FRAMES.
No. 554,408. Patented Feb. 11, 1896.

WITNESSES
Mary Caverly.
Sam! G. Stephens.

INVENTOR
Channing Whitaker.

(No Model.) 9 Sheets—Sheet 7.
C. WHITAKER.
CONE RACK ACTUATING MECHANISM FOR FLY FRAMES.
No. 554,408. Patented Feb. 11, 1896.

FIG. 19.

WITNESSES.
Mary Caverly.
Saml. G. Stephens.

INVENTOR.
Channing Whitaker.

(No Model.) 9 Sheets—Sheet 8.

C. WHITAKER.
CONE RACK ACTUATING MECHANISM FOR FLY FRAMES.

No. 554,408. Patented Feb. 11, 1896.

WITNESSES.
Mary Caverly.
Saml. G. Stephens.

INVENTOR.
Channing Whitaker.

UNITED STATES PATENT OFFICE.

CHANNING WHITAKER, OF TYNGSBOROUGH, ASSIGNOR TO THE LOWELL MACHINE SHOP, OF LOWELL, MASSACHUSETTS.

CONE-RACK-ACTUATING MECHANISM FOR FLY-FRAMES.

SPECIFICATION forming part of Letters Patent No. 554,408, dated February 11, 1896.

Application filed October 10, 1893. Serial No. 487,770. (No model.)

*To all whom it may concern:*

Be it known that I, CHANNING WHITAKER, a citizen of the United States, residing at Tyngsborough, in the county of Middlesex and Commonwealth of Massachusetts, have invented certain new and useful Improvements in Cone-Rack-Actuating Mechanisms for Fly-Frames, of which the following is a specification, reference being had therein to the accompanying drawings.

My invention relates to the spinning-machines which are known as "fly-frames," and more particularly it relates to the mechanisms which are employed in such machines, in connection with the cone-belts thereof, for the purpose of intermittently advancing the said cone-belts along the cones during the regular working of the fly-frames, as is required during the filling of the bobbins and for winding up—that is to say, returning the cone-belts to the starting ends of the cones preparatory to restarting with fresh sets of empty bobbins.

One object of my invention is to avoid the unnecessary consumption of power which heretofore has occurred in a fly-frame in consequence of the wind-up shaft remaining always in operative gear connection with the cone-rack, with which latter is connected the belt-guide for the cone-belt, the said wind-up shaft having had movement of rotation communicated thereto heretofore whenever movement has been given to the cone-rack. The wind-up shaft is used in a fly-frame mainly for the purpose of returning the cone-rack to its starting position in the fly-frame after the completion of the winding upon a set of bobbins, and of thereby replacing the cone-belt upon the starting ends of the cone-pulleys in readiness for beginning to wind upon a new set of bobbins. The movement of rotation which has been communicated heretofore to the wind-up shaft as the cone-rack has been advanced during the regular working of the fly-frame is without accompanying practical advantages.

In accordance with the first part of my invention, therefore, I have made provisions whereby the wind-up shaft is permitted to remain normally out of operative connection with the cone-rack, with capacity for being placed in such connection when required.

Another object of the invention is to provide for producing, whenever the wind-up shaft is placed in operative connection with the cone-rack, a break or disconnection in the train of mechanism by which the cone-rack is moved endwise during the regular working of the fly-frame, this break or disconnection leaving the cone-rack free to be moved or adjusted back to its starting position, as required when a fresh set of empty bobbins is introduced into the machine. In accordance with this part of my invention, therefore, I have provided devices whereby, when the wind-up shaft is thrown into operative connection with the cone-rack, the break or disconnection aforesaid is produced.

Another object of the invention is to provide means for raising the bottom cone simultaneously with the placing of the wind-up shaft in operative connection with the cone-rack, in order thereby to slacken the cone-belt and enable it to be slipped readily lengthwise of the cones.

Other objects of the invention will become apparent in the course of the detailed description of the invention which is contained hereinafter in this specification.

The invention consists in certain novel features of construction and arrangement and in certain novel combinations of parts, all as I will now proceed to describe with reference to the accompanying drawings, and as will be particularly pointed out and clearly defined in the claims at the close of this specification.

In the drawings, Figure 1, Sheet 1, is a view in rear side elevation of a portion of the length of a fly-frame having my invention applied thereto. Fig. 1$^a$, Sheet 2, is a similar view, it showing the portion of the length of the fly-frame which is immediately at the right-hand side of the portion that is represented in Fig. 1. Figs. 1 and 1$^a$, taken together, show practically the entire length of the portion of the fly-frame that is known as the "head" thereof. Fig. 1$^b$, Sheet 1, is a view showing the segment-gear in plan and the tumbling-shaft in horizontal section on line 1ᵇ 1ᵇ of Fig. 1.

Figures 1, 1B:
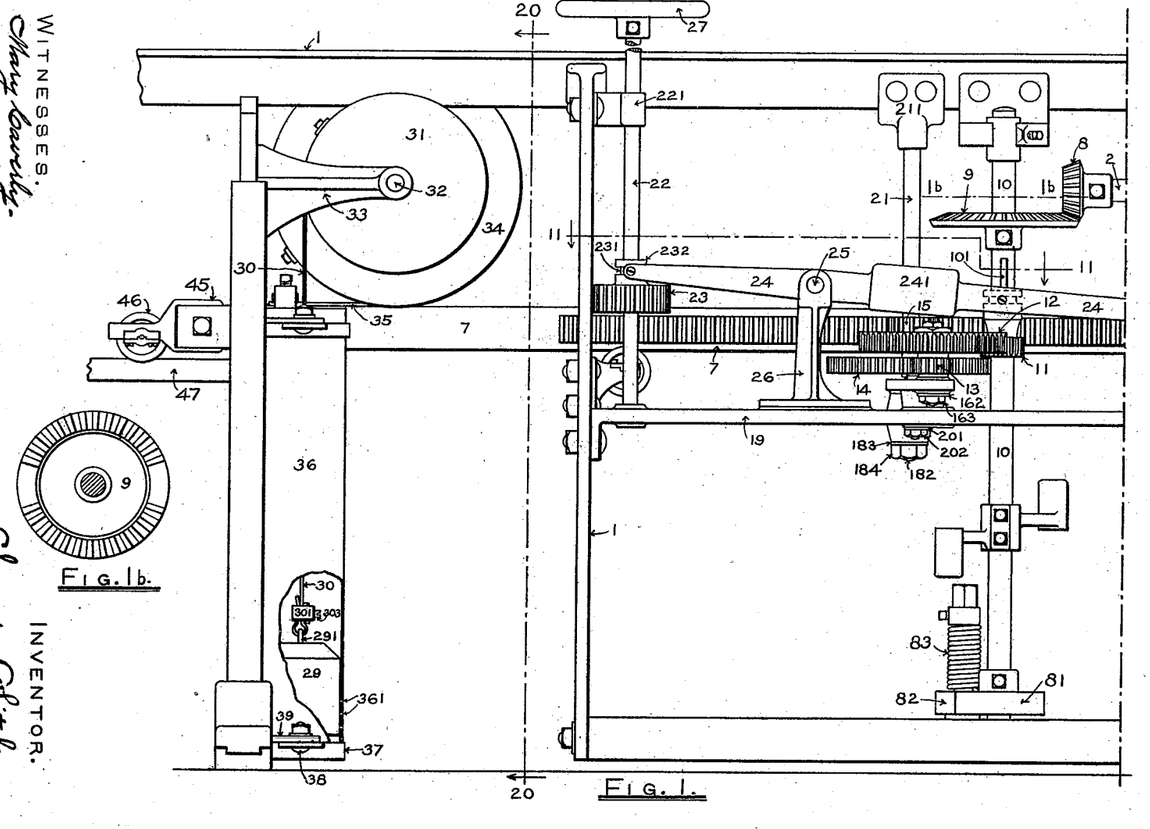

At 1 in the drawings is shown the machine-framing, at 2 the shaft of the upper cone-pulley, at 3 the said upper cone-pulley, at 4 the lower cone-pulley, at 5 the cone-belt passing around the said cone-pulleys 3 and 4, at 6 the cone-belt guide, and at 7 the cone-rack by which the cone-belt guide is carried. At 8 is shown the bevel-gear fast on the inner end of the shaft 2 of the upper cone-pulley. At 9 (see particularly Figs. 1 and 1ᵇ) is shown the segment-gear which is mounted on the upper end of the tumbling-shaft, and at 10 is shown the tumbling-shaft, to which last an intermittent motion of rotation is communicated through the said gears 8 and 9 at the times indicated by the well-known controlling devices co-operating in practice with the said tumbling-shaft. At 81 is a starting-cam on the tumbling-shaft. At 82 is the starting arm or finger acting upon the starting-cam, and at 83 is the spring which bears the starting-arm against the starting-cam, all being substantially as in United States Letters Patent No. 485,171, granted November 1, 1892, to W. P. Canning, save that herein the starting-cam is mounted on the tumbling-shaft instead of upon the reverse shaft shown in the said patent.

As is well known, in the working of a fly-frame the cone-rack thereof is moved endwise intermittently, so as, through its connected belt-guide, to shift the cone-belt gradually along the cone-pulleys in proportion as the bobbins fill with roving. This intermittent motion is communicated to the cone-rack from the tumbling-shaft through a train of devices located intermediate the cone-rack and the intermittingly-rotating tumbling-shaft, and usually comprising a train of gearing, with sometimes other mechanical elements.

A simple and convenient arrangement and combination of gearing which I prefer to employ for transmitting movement to the cone-rack from the tumbling-shaft is shown in the drawings. In the latter a driving-pinion 11, mounted on the tumbling-shaft 10, meshes with a driven gear 12, which is connected with a pinion 13 and turns in unison therewith, the said pinion 13 meshing with a gear 14, that is connected with a pinion 15 in such a manner as to turn in unison therewith, the said pinion 15 being in mesh with the cone-rack 7. The gear 12 is a change-gear, and is removably connected with the pinion 13. I have shown it thus connected by being slipped upon the extended hub 131 of the said pinion, the said hub being provided with a pin 132, that compels the gear 12 to turn in unison with pinion 13, and the gear being retained upon the hub 131 by a nut 133, that is turned upon the threaded end of the hub. The said connected pinion and gear are mounted upon the stud 16 and are prevented from rising thereon by the screw 17, which has its threaded stem turned into a threaded hole in the upper end of the stud, the edge of the head of the said screw overlying the upper end of hub 131.

The stud 16 is formed with a flange or collar 161, on which the pinion 13 rests, and the reduced lower end of the stud is passed through a hole 181 in an arm or gear-carrier 18, it receiving on the threaded portion thereof, below the said arm or gear-carrier, the washer 162 and nut 163, by which the stud is held to the said arm or gear-carrier.

The arm or gear-carrier 18 is capable of being moved or swung in an arc that is concentric with the axis of the gear 14 and pinion 15, this capacity being necessary in order to permit gears 12 of different sizes to be used. The said arm or gear-carrier 18 is provided with a journal or pivot 182, which is fitted to a bearing in a lateral extension 191, provided on the cross-girt 19, the said journal or pivot receiving on its threaded end below the bearing the washer 183 and nut 184.

Figure 12:
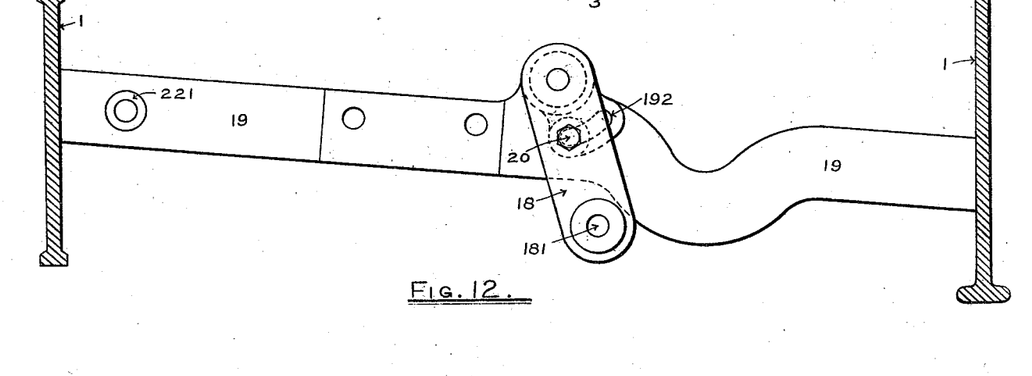
Fig. 12, Sheet 4, is a similar view, but with certain of the parts shown in Fig. 11 omitted.

For the purpose of holding the arm or gear-carrier 18 fixedly in position after having been adjusted to the position which is required in order to place the gear 12 in proper mesh with pinion 11, a clamping device is provided for the said arm or gear-carrier. In the drawings (see particularly Figs. 1 and 12) I have shown the arm or gear-carrier 18 clamped in the desired position by means of a bolt 20, that passes through a hole in the said arm and also through a slot 192 in the cross-girt 19, and receives on its threaded end below the cross-girt a washer 201 and nut 202, which are turned up tightly against the under side of the cross-girt. The slot 192 is concentric with the axis of the journal or pivot 182.

The gear 14 and pinion 15 are or may be mounted upon a short shaft 21, having its lower end stepped in the arm or carrier 18 at the axis on which the latter swings, the said shaft having its upper end supported by a bracket or stand 211, which is affixed to a portion of the machine-framing. (See Figs. 1 and 3 of the drawings.)

The gradual endwise advance of the cone-rack by which the cone-belt is shifted along the cone-pulleys is continued in practice during the filling of the bobbins with roving. When the desired amount of roving has been wound upon the bobbins the machine is stopped, and in preparing for restarting with a fresh set of empty bobbins the cone-rack is returned to its starting position, in order to return the cone-belt to the starting ends of the cones. It is customary to provide what is known as a "wind-up shaft" for effecting this return of the cone-rack, the said shaft being provided with a hand-wheel by means of which it may be turned by hand, and the shaft being geared to the cone-rack. Ordinarily the construction is such that the wind-up shaft remains always in operative gear connection with the cone-rack, and hence the said shaft has movement of rotation communicated thereto from the cone-rack as the latter is advanced in the regular working of the fly-frame. This movement of rotation thus communicated from the cone-rack to the wind-up shaft in the regular working of the fly-frame is needless, and there is, therefore, an unnecessary expenditure of energy. It is required that the wind-up shaft should be in operative connection with the cone-rack only at such times as it is to be employed in effecting the return of the cone-rack to its starting position. In accordance with the first part of my invention, therefore, I have so arranged and combined the parts that the said shaft normally is out of operative connection with the said cone-rack, and have rendered it capable of being placed temporarily in such connection when required.

Figures 2, 3, 4, 5, 6, 7, 8, 9, 10:
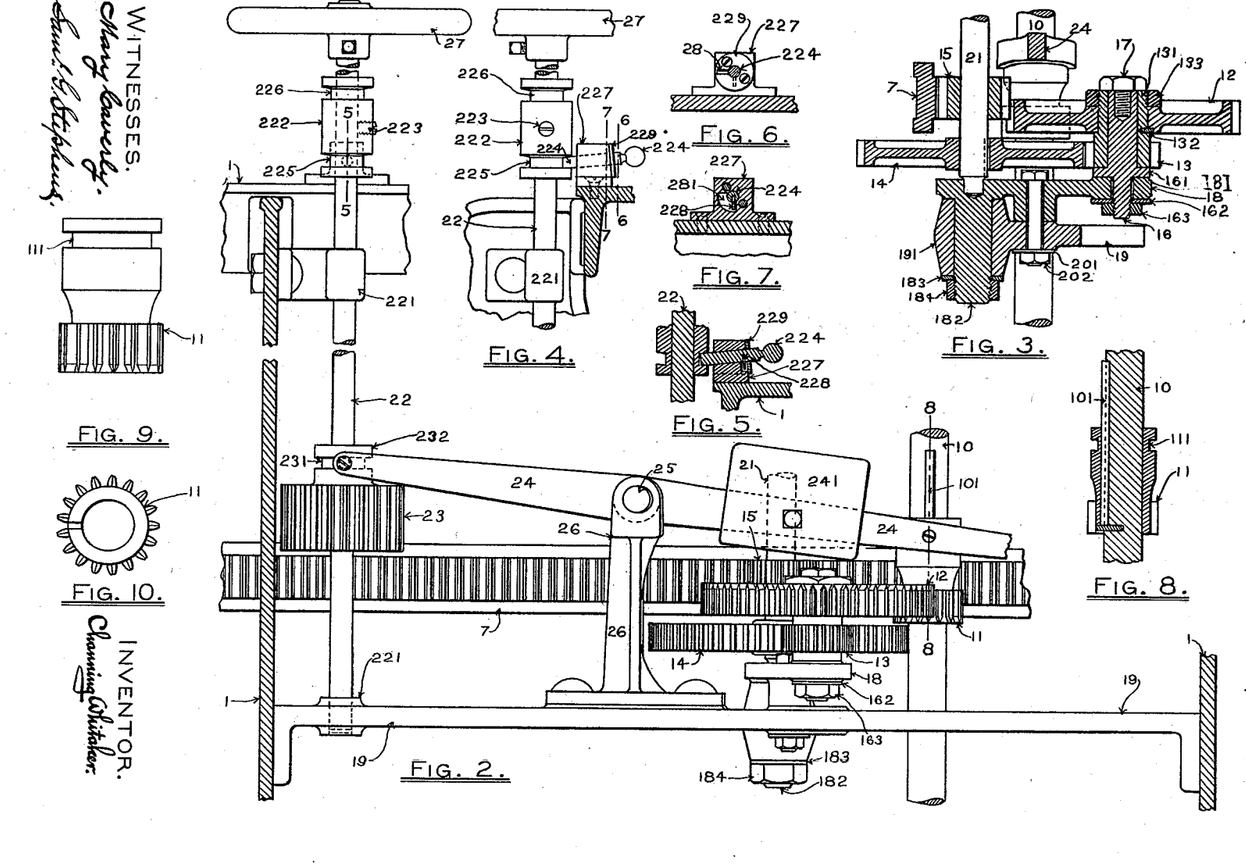
Fig. 2, Sheet 3, is a view in rear side elevation, on an enlarged scale, of a part of the devices that are shown in Fig. 1, it presenting mainly the cone-rack, the tension-motion, the wind-up devices, and the shipping devices for the tension-motion.
Fig. 3, Sheet 3, is a view in vertical section on line 3 3 of Fig. 11, Sheet 4.
Fig. 4, Sheet 3, is a detail view, with the machine-framing partly in vertical section, showing the upper portion of the wind-up shaft and the parts immediately adjacent thereto.
Fig. 5, Sheet 3, is a detail view in vertical section on line 5 5 of Fig. 2.
Fig. 6, Sheet 3, is a similar view in section on line 6 6 of Fig. 4.
Fig. 7, Sheet 3, is a similar view in section on line 7 7 of Fig. 4.
Fig. 8, Sheet 3, is a detail view, in vertical section on the line 8 8 of Fig. 2, of a portion of the tumbling-shaft and the driving-pinion that is mounted thereon.
Fig. 9, Sheet 3, is a view illustrating the said driving-pinion in elevation.
Fig. 10, Sheet 3, is an inverted view of the said driving-pinion.

The breaking and re-establishing of the operative connection between the wind-up shaft and cone-rack may be accomplished in various ways. Various arrangements and contrivances having the desired end in view have been contrived by me. A simple mode of occasioning the break and re-establishment is by moving the shaft itself so as to separate the gearing. This movement may be occasioned in varied ways. In Figs. 1, 2, and 4 of the drawings I have shown the wind-up shaft 22 held in bearings 221 221, in which it is free not only to rotate, but to slide vertically. The gear 23 is fixed on the shaft 22 and is intended to mesh with the cone-rack 7. In Figs. 1 and 2 gear 23 is shown raised above the cone-rack, and out of gear therewith. In order to place the said gear 23 in mesh with the rack it is necessary only to move the shaft downward, when the teeth of gear 23 will slide into those of the cone-rack.

Various contrivances may be combined with shaft 22 for the purpose of holding it in its normal inoperative position, facilitating its change of position and moving it into and out of operative position. I have shown in Figs. 1, 2, and 11 a preferred arrangement of parts, in which the hub 232 of the gear 23, or a separate collar fast on shaft 22, is formed with a groove 231, that receives pins projecting from the fork at the adjacent end of a lever 24, which latter is pivoted on a pin 25 in bearings at the upper end of a forked standard 26, the latter being mounted on the cross-girt 19. In cases in which no other means is provided for pressing the wind-up shaft upwardly, and in those cases in which the right-hand arm of lever 24 in Figs. 1 and 2 and its connections do not preponderate sufficiently over the left-hand arm of the said lever and its connections, the lever is formed or provided with a weight 241, which is located on the side of the fulcrum of the lever that is opposite to the side on which shaft 22 is located, the said weight being heavy enough to bear up with some considerable force the shaft 22, and parts carried by the latter, into the position which is represented in Figs. 1 and 2, in which position the gear 23 is out of mesh with the cone-rack 7. By downward pressure applied to the hand-wheel 27 the operative may readily depress the shaft 22 and slide the gear 23 into proper mesh with the cone-rack. The shaft may be kept in a depressed position by continuing the said pressure, and at the same time may be turned by hand or be permitted to turn, as may be required. On occasions it is convenient to be able to lock the shaft 22 in either a raised position or a depressed position.

I have shown in Figs. 2, 4, 5, 6, and 7 a simple and convenient form of locking device which I contemplate employing. This locking device comprises as its essential parts a grooved sleeve 222 and a pin or bolt 224. The sleeve 222 is held in place on the shaft 22 by a clamping-screw 223. The pin or bolt 224 slides in a holder 227, which is fixed to the machine-framing, and the end of the pin or bolt 224 may be pushed by hand into one of the grooves 225 226 in the sleeve 222 when the latter is presented in position opposite the said pin or bolt. When the shaft 22 is in a depressed position, the said pin or bolt may be pushed into the upper groove, 226, which then will be in position to be entered by the end thereof, and when the shaft is in a raised position, as shown, the pin or bolt may be pushed into the lower groove, 225, as shown.

To hold the pin or bolt in the desired groove in the sleeve 222, it is provided with a laterally-projecting pin 228. On the holder 227 is fastened a face-plate 229, through a hole in which the pin or bolt 224 is passed, this face-plate having a lateral slot 28 leading from the hole, which will permit the passage of the projecting pin 228 when the pin or bolt 224 has been rotated on its axis sufficiently to bring the pin 228 around to the said slot 28. In the face of the holder 227, behind the face-plate 229, is a cavity 281, having such dimensions as will permit pin 228 to swing from the horizontal position, which it must be given in order to pass it through the slot, to the vertical locking position shown in Fig. 7, in which it normally hangs. When pin 228 occupies the said vertical position in the said cavity 281 behind the face-plate 229, the pin or bolt 224 is locked against outward movement, such as might result from an accidental blow or jar. In order to unlock and withdraw the pin or bolt 224, it must first be rotated until pin 228 is presented opposite to the slot 28, through which it then will pass as the pin or bolt 224 is drawn out.

Figure 11:
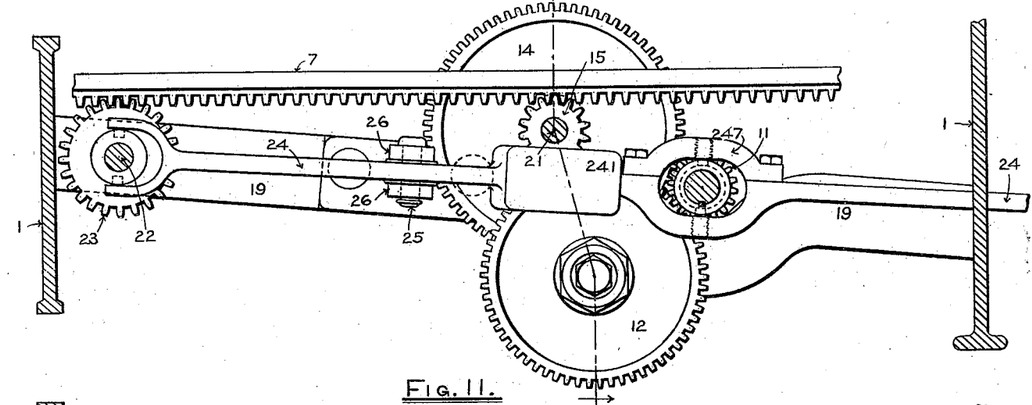
Fig. 11, Sheet 4, is a view in horizontal section on line 11 11 of Fig. 1.

Before the cone-rack of a fly-frame can be wound up or returned to the starting position thereof, it is necessary to occasion a break or disconnection in the train of operating connections which is employed intermediate the tumbling-shaft and the cone-rack for moving the rack endwise during the regular working of the fly-frame in order that the cone-rack may be permitted to move notwithstanding the fact that the tumbling-shaft stands still. Various known contrivances and arrangements permit this break or disconnection to be occasioned. One object of my invention, as has been indicated herein already, is to cause this break or disconnection to be produced automatically whenever the wind-up shaft is placed in operative connection with the cone-rack. A simple and preferred means of securing this result is shown in Figs. 1, 2, 8, and 11. In these figures the driving-pinion 11 is shown fitted to slide upon the shaft 10, longitudinally of the latter, and is compelled to rotate in unison with the latter by means of a spline 101 on the said shaft. The weighted end of lever 24, as shown in Fig. 11 most clearly, is fitted with pins which enter a groove 111 in the hub of the driving-pinion 11, one of the said pins being applied to a cap-piece 247, affixed to the lever so as to extend past the side of the pinion which is opposite to that side of the pinion on which the main part of the lever is located. Thereby when the wind-up shaft is depressed for the purpose of sliding the teeth of gear 23 into mesh with those of the cone-rack 7 the driving-pinion 11 simultaneously is carried upward in such manner as to withdraw its teeth from mesh with those of the gear 12, thus disconnecting from the tumbling-shaft 10 the gearing which transmits motion to the cone-rack. When the wind-up shaft is permitted or caused to rise again, so as to withdraw the teeth of gear 23 from their engagement with the teeth of the rack, the driving-pinion 11 simultaneously therewith is depressed into position to become re-engaged with gear 12.

By preference the teeth of the driving-pinion 11 and the teeth of the gear 12 are made a little longer than usual, and the lower sides of the teeth of the said driving-pinion and the upper sides of the teeth of the said gear are pointed, as shown in Figs. 1, 2, 9, and 10. This facilitates the entrance of the teeth of the driving-pinion 11 among those of the gear 12 as the driving-pinion is moved in being restored to the position of engagement, it preventing the lower sides of the teeth of the pinion 11 from contacting with the upper sides of the teeth of the gear 12. Should this contact occur, as will be likely when the sides of the teeth of the pinion and gear are made of customary form, the pinion cannot descend until after the teeth thereof have been carried, in the next movement of rotation of the tumbling-shaft, around sufficiently to present them properly to the spaces between the teeth of the gear 12. From this will result a loss of part of the movement that should be transmitted to the cone-rack in consequence of this movement of the tumbling-shaft. The pointed form of the teeth also guards against loss of the relative position of the pinion 11 and gear 12 in consequence of recoil of the transmitting-gearing occurring at the time of or during the break or disconnection. Unless the recoil, when it occurs, is sufficient in amount to carry the point of a given tooth on gear 12 circumferentially around past the position of the point of the corresponding tooth on the raised pinion 11, the latter tooth will pass down, at the time of effecting the re-engagement, on the side of the former tooth on which it was before the break or disconnection. These and other advantages of the pointed teeth are set forth more fully in my application for patent for improvement in fly-frames filed October 10, 1893, Serial No. 487,769.

Figures 13, 14, 16:
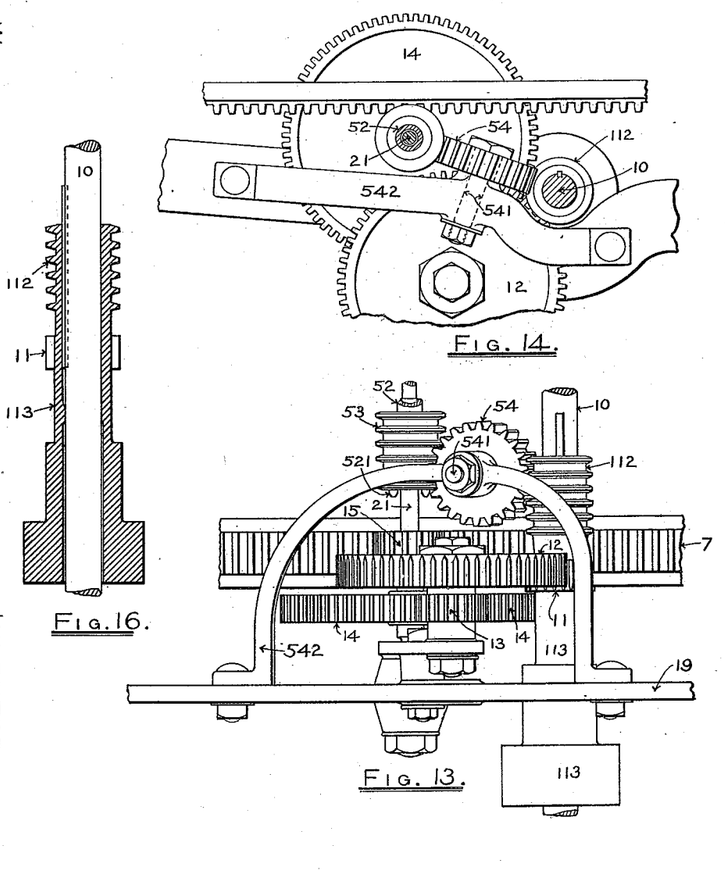
Figs. 13 to 19, inclusive, Sheets 5, 6, and 7, are views presenting modifications which are hereinafter fully described.

Fig. 13, Sheet 5, shows in rear elevation, and Fig. 14 in plan, partly broken away, a construction embodying a modification in the means of placing the wind-up shaft in and out of operative connection with the cone-rack and of effecting a break or disconnection in the connections intermediate the tumbling-shaft and the cone-rack.

Figure 15:
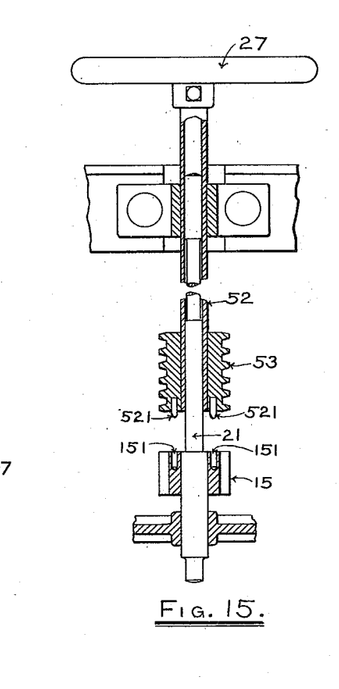

Fig. 15, Sheet 5, is a view, partly in vertical section, showing the wind-up shaft and parts applied thereto.

Fig. 16, Sheet 5, is a view, partly in vertical section, showing a portion of the tumbling-shaft and the driving-pinion thereon. In this modification the separate wind-up shaft 22 and gear 23 are dispensed with. Upon the upper end of the shaft 21 (shown also in Figs. 1, 2, and 3) I mount, in this modification, the loose sleeve 52, having the hand-wheel 27 fast upon its upper end. The gear 15 is fast upon the shaft 21, and is provided in its upper side with holes 151 151 for the reception of pins or projections 521 521, depending from the collar 53, fast on the lower end of the sleeve 52; or the gear 15 and sleeve 52 are otherwise fitted for being engaged or clutched with each other. The collar 53 is formed with annular ribs, as shown, forming a cylindrical rack. A similar collar 112, also formed upon its exterior with annular ribs to constitute a cylindrical rack, is connected with the driving-pinion 11 on the tumbling-shaft, and the ribs of the two collars are in engagement with the teeth of the gear 54, which is located intermediate the two and is mounted to turn on a stud 541, passed through the stand 542, fixed on the girt 19.

The pinion 11 and rack 112 are shown formed upon a sleeve 113, which last is extended below the pinion, and in its extended lower portion is enlarged so as to furnish sufficient weight to cause the sleeve to gravitate downwardly upon the tumbling-shaft. The weight of the sleeve holds driving-pinion 11 normally depressed in position for engagement with the gear 12 and, acting through racks 112 and 53 and the gear 54, raises the sleeve 52, so as to disconnect the same from gear 15. When pressure is applied to hand-wheel 27 so as to depress the sleeve 52, or the sleeve otherwise is depressed, the sleeve is clutched to gear 15, and simultaneously through the racks 53 and 112 and the gear 54 the pinion 11 is raised.

Figures 17, 18:
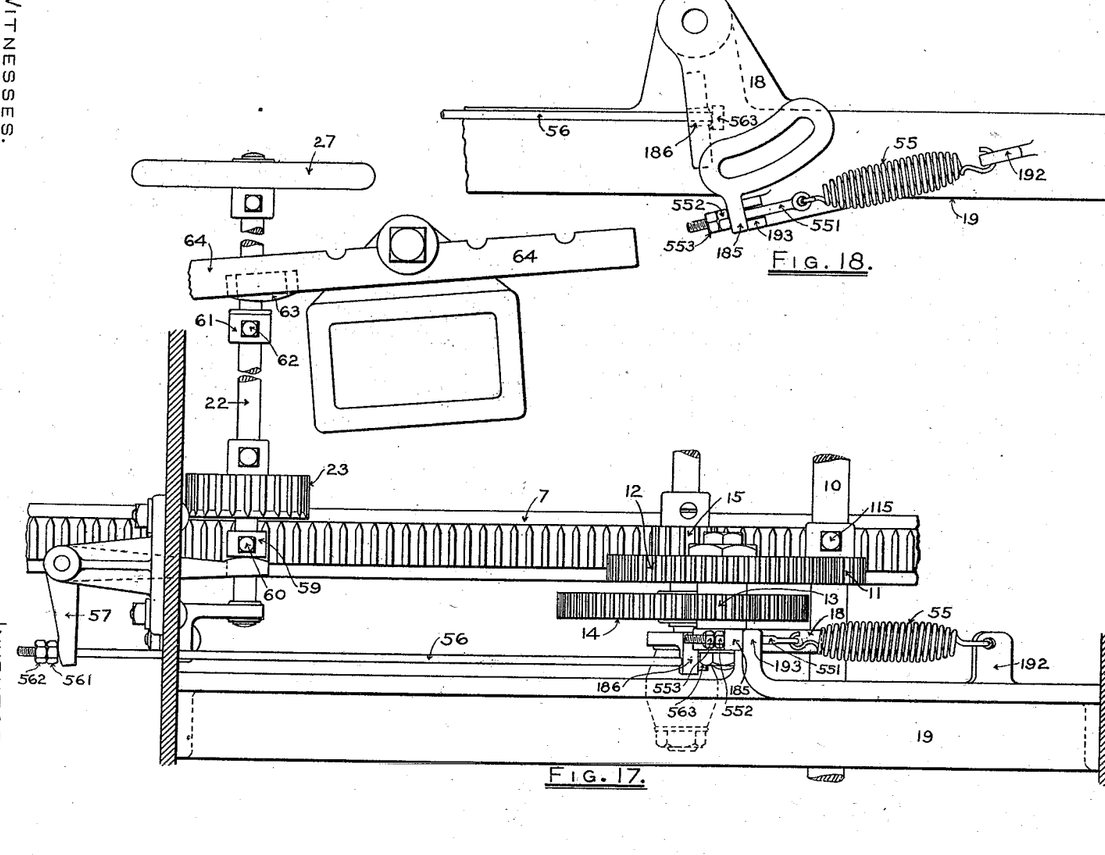

Fig. 17, Sheet 6, shows in rear elevation a construction in which is embodied a swinging gear-carrier serving as a movable support for a portion of the transmitting-gearing intermediate the tumbling-shaft and the cone-rack, the said gear-carrier being moved to separate the said gearing through devices intermediate the same and the wind-up shaft. In this figure is shown, also, the manner in which the wind-up shaft may be operated by the stop-motion lever, in order to depress the said shaft automatically upon the release of the said lever.

Fig. 18, Sheet 6, is a view showing in plan certain of the parts which are represented in Fig. 17. In the modification that is shown in these two figures the driving-pinion 11 is fixed in position on the tumbling-shaft 10 by means of a clamping-screw 115, and the arm 18 is left free to turn upon its journal, being held drawn normally by a spring 55 into the position which places gear 12 in proper mesh with pinion 11. One end of the spring 55 is connected with a projection 192 on the cross-girt 19, and the other end thereof is connected with a screw-eye 551, the stem of which passes through a lug 185 on the arm 18, and is provided with nuts 552 553. The lug 185 strikes against a lug 193 on the girt 19 when the arm has reached its proper position under the action of the spring 55, and thereby the movement of the arm is arrested as soon as the gear 12 has come into proper mesh with driving-pinion 11. For the purpose of acting upon the arm 18, so as to move the same as required for withdrawing gear 12 from mesh with driving-pinion 11, the arm is provided with a depending lug 186, through which is passed a rod 56, having a head 563 thereon adapted to engage with the said lug in the movement of the rod 56 toward the left in Fig. 17. The other end of the rod 56 passes through a hole in the depending vertical arm of a bell-crank 57, and receives thereon outside the said arm the nuts 561 and 562. The horizontal arm of bell-crank 57 projects beneath a collar 59 on the wind-up shaft 221, the said collar being clamped in position on the said shaft by means of the screw 60. Through the devices described, when the wind-up shaft 22 is depressed so as to place its gear 23 in mesh with the cone-rack, the arm or gear-carrier 18 is moved so as to separate the gear 12 from the driving-pinion 11. When the pressure upon the wind-up shaft is relieved, the spring 55 operates to restore both the said shaft and the arm or gear-carrier to their former positions.

In Fig. 17 I have shown a collar 61, secured upon the wind-up shaft above gear 23 by means of a screw 62, this collar being located in position to be acted upon by the projection 63 on the weighted stop-motion lever 64 when the said lever is freed, so as to permit the weighted arm thereof to descend. I am thus enabled, when desired, to provide for the automatic depression of the wind-up shaft. If the wind-up shaft is arranged to be acted upon thus by the stop-motion lever, I form the upper sides of the teeth of the cone-rack and the lower sides of the teeth of gear 23 pointed, as shown in Fig. 17, in order to facilitate the entrance of the gear into proper mesh with the cone-rack.

Figure 1A:
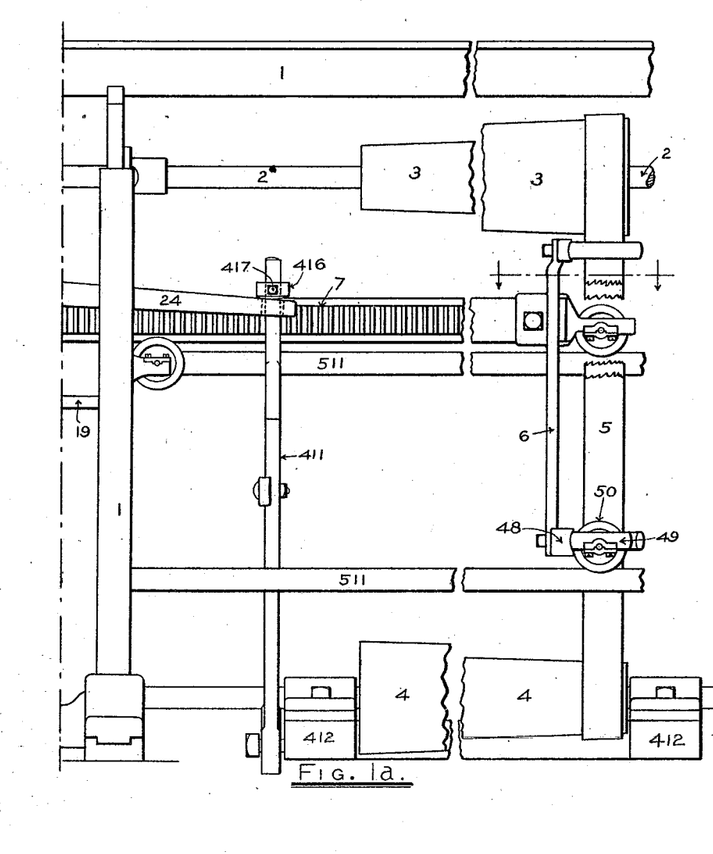

Before the winding up can be effected it is necessary to slacken the cone-belt, in order to facilitate its movement endwise of the cone-pulleys. It is customary to occasion this slackening by raising slightly the bottom cone through a device known as a "cone-lift," which is operated at the desired time by hand. For the purpose of rendering unnecessary the lifting of the bottom cone by an additional operation, separately performed by the attendant upon the machine, I provide connections whereby the said cone is lifted simultaneously with the placing of the wind-up shaft in operative connection with the cone-rack. Figs. 1, 1ª, and 11 illustrate one form of these connections. In the said figures the right-hand arm of the lever 24 is prolonged beyond the tumbling-shaft 10 to a point adjacent to the ends of the cones, and through a hole in the free end of the said arm passes the upper end of a rod 411, the said rod having its lower end joined to the swinging frame 412, in which the lower cone, 4, is journaled. At 416 is shown a collar adjustably secured on the upper end of the rod 411 by a screw 417. When the right-hand end of the lever 24 is caused to rise, it strikes this collar and thereby is enabled to carry upward the rod 411 and lift the swing-frame 412.

Figure 19:
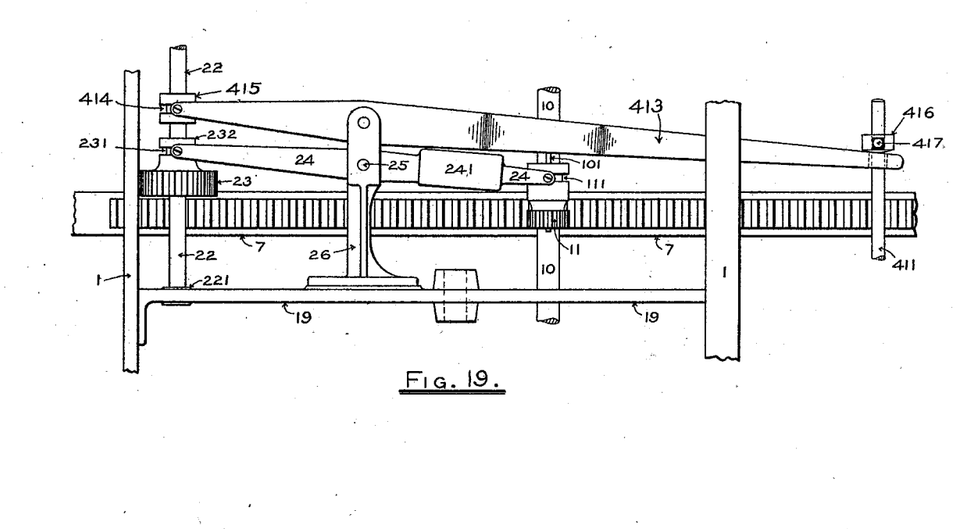

Fig. 19, Sheet 7, shows a modified arrangement in which is employed a second lever 413, located adjacent to the lever 24, the said lever 413 having the rod 411 acted upon by one arm thereof, and having the other arm engaged with the groove 414 in the collar 415, mounted on the wind-up shaft 22.

The backlash, which in fly-frames exists in the gearing connections intermediate the cone-rack and the tumbling-shaft, is the cause of the production of considerable defective roving, inasmuch as on account of such backlash movement is communicated irregularly to the cone-rack. Unless the cone-rack is moved at the proper times and to the required extent, so as to advance the cone-belt regularly along the cone-pulleys, and to the full predetermined extent at each movement of the tumbling-shaft, and so as thereby to compensate properly for the increasing diameters of the bobbins as layer after layer of roving is wound thereon, the successive layers are not wound upon the bobbins with the right degree of tension, and hence the injury to the roving. The evil effects of the backlash are noticed in particular just after the cone-rack and belt-guide have been wound back and the machine has been restarted with a new set of bobbins. The amount of backlash is so great in some fly-frames that after restarting one or more movements of the tumbling-shaft are found to occur before any advance whatever of the cone-rack is occasioned. In order to obviate the said evil effects, I employ a contrivance for counteracting the backlash.

Various known devices and arrangements for taking up backlash are suitable for the purpose and may be employed. By preference, however, I apply to the cone-rack a yielding compensating device which is connected and arranged in such manner as constantly to exert upon the cone-rack, and all its actuating connections extending to and including the tumbling-shaft, a considerable amount of strain which shall have the effect of holding in intimate contact, throughout the entire train of transmitting devices, all the intermeshing or mutually-engaging elements of the said train. Thereby every impulse derived from the motion of the tumbling-shaft will be transmitted to the rack without diminution on account of lost motion or backlash. The said compensating device preferably is arranged to act with a tendency to push the cone-rack backward, and so as to resist somewhat the action of the tumbling-shaft in advancing the cone-rack.

Figures 20, 21, 22, 23, 24, 25:
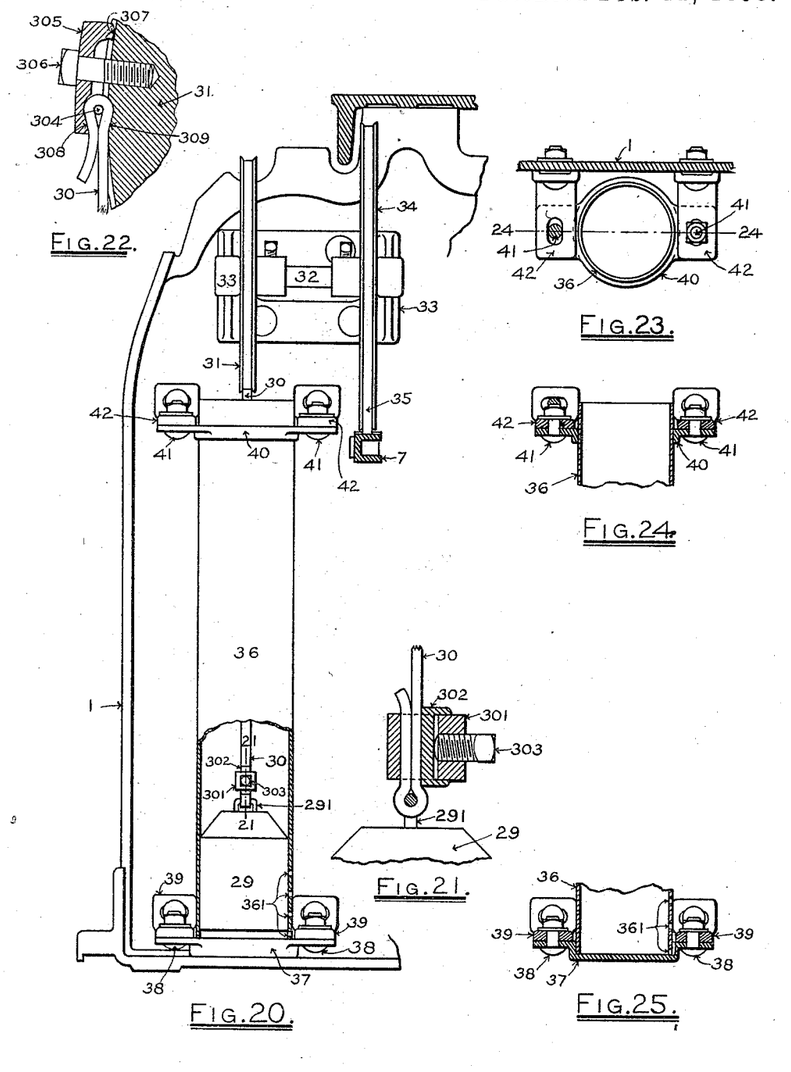
Fig. 20, Sheet 8, is a view in vertical section, with a part removed, on line 20 20 of Fig. 1, looking in the direction of the arrow in the latter figure.
Fig. 21, Sheet 8, is a view in vertical section on line 21 21 of Fig. 20.
Fig. 22, Sheet 8, is a view in vertical section showing a portion of one of the pulleys hereinafter described, the band connected therewith, and the device for securing the said band to the said pulley.
Fig. 23, Sheet 8, is a view, partly in plan and partly in horizontal section, showing the upper end of the casing surrounding the weight that is connected with the cone-rack.
Fig. 24, Sheet 8, is a view in vertical section on the line 24 24 of Fig. 23, showing a portion of the upper end of the said casing and the supports therefor.
Fig. 25, Sheet 8, is a view in vertical section showing the lower end of the said casing and the supports therefor.

Fig. 1, Sheet 1, and Fig. 20, Sheet 8, show a weight 29, connected with the cone-rack through intermediate devices in a manner which causes it to bear the cone-rack backwardly as stated. The character of the said intermediate connecting devices may be varied as required. The said weight 29 is shown in the said figures of the drawings as having attached to it one end of a strap 30, which latter has the upper end thereof attached to the periphery of a pulley 31, that is mounted on a shaft 32, journaled in bearings in a stand 33, secured to the machine-framing. On shaft 32 is a second and larger pulley 34, to the periphery of which is attached one end of a second band 35, the latter having its opposite end attached to the cone-rack at a point near the end of the latter which is adjacent to the pulleys aforesaid. As the cone-rack is advanced, by the actuating devices which have been described, toward the left-hand side in Fig. 1, the band 35 is unwound from pulley 34, thereby rotating said pulley, the shaft 32 and the pulley 31, and winding the band 30 on the pulley 31, thereby raising weight 29. The gravity of the said weight acts with a constant force tending to carry the cone-rack backwardly against the action of its operating-gearing, thereby holding the teeth of the said gearing down to the driving-pinion on the tumbling-shaft in close contact with one another at the intermeshing-points and taking up all the backlash which may exist throughout the train. Through thus acting, the weight operates to prevent backward and forward lengthwise movement or play of the cone-rack, such as would be occasioned by the pressure and swaying of the cone-belt as it moves within the belt-guides which are carried by the cone-rack, and by the irregularities in the side edges of the cone-belt, which irregularities are continually bumping against the one side or the other of the said belt-guides. The force exerted by the weight 29, however, should not be sufficient to produce reverse rotation of the tumbling-shaft 10 against the action of the spring-pressed starting arm or finger 82 (see Fig. 1)

upon the starting-cam 81, fixed upon the tumbling-shaft. Moreover, the spring 83 must be as much stiffer than usual, when the weight 29 is used, as will enable it to overcome the opposing effect of the weight, in addition to performing all of its other functions which it performs when the weight 29 is not employed.

The lower portion of the band 30 is shown doubled around a bail 291 provided on the weight 29, (see Fig. 21,) and the doubled part is clamped by means of a rectangular open loop 301, through which both portions thereof are passed, a movable plate or gib 302 being placed within the opening of the said loop, and a screw 303 being passed through a threaded hole in one side of the said loop and caused to take bearing at its inner end against the said movable plate or gib, which latter thereby is caused to clamp the two parts of the band between itself and the opposite side of the loop. The upper portion of the band 30 is doubled over a wire 304 (see Fig. 22) and clamped to the periphery of the pulley 31 by a plate 305, that is forced down upon the doubled-over portion by means of a screw 306, passing through plate 305 and into the pulley. The pulley and the under side of the clamping-plate 305 at one end of the latter are formed with transverse concavities to receive the enlargement produced by the presence of the wire within the fold of band 30, the surfaces 308 and 309 at the forward sides of the said concavities converging in the direction of the pull on band 30. At its other end the clamping-plate 305 takes bearing at the point 307 upon the surface of the pulley. Strain on the band 30 tending to withdraw its doubled-over portion from beneath the clamping-plate 305 simply operates to wedge the wire 304 and the portion of the band inclosing the same more tightly between the converging surfaces 308 309. The foregoing provides for very effectually connecting in an adjustable manner the ends of the band 30 to the periphery of pulley 31 and to the weight 29.

Figures 26, 27, 28, 29, 30, 31, 33:
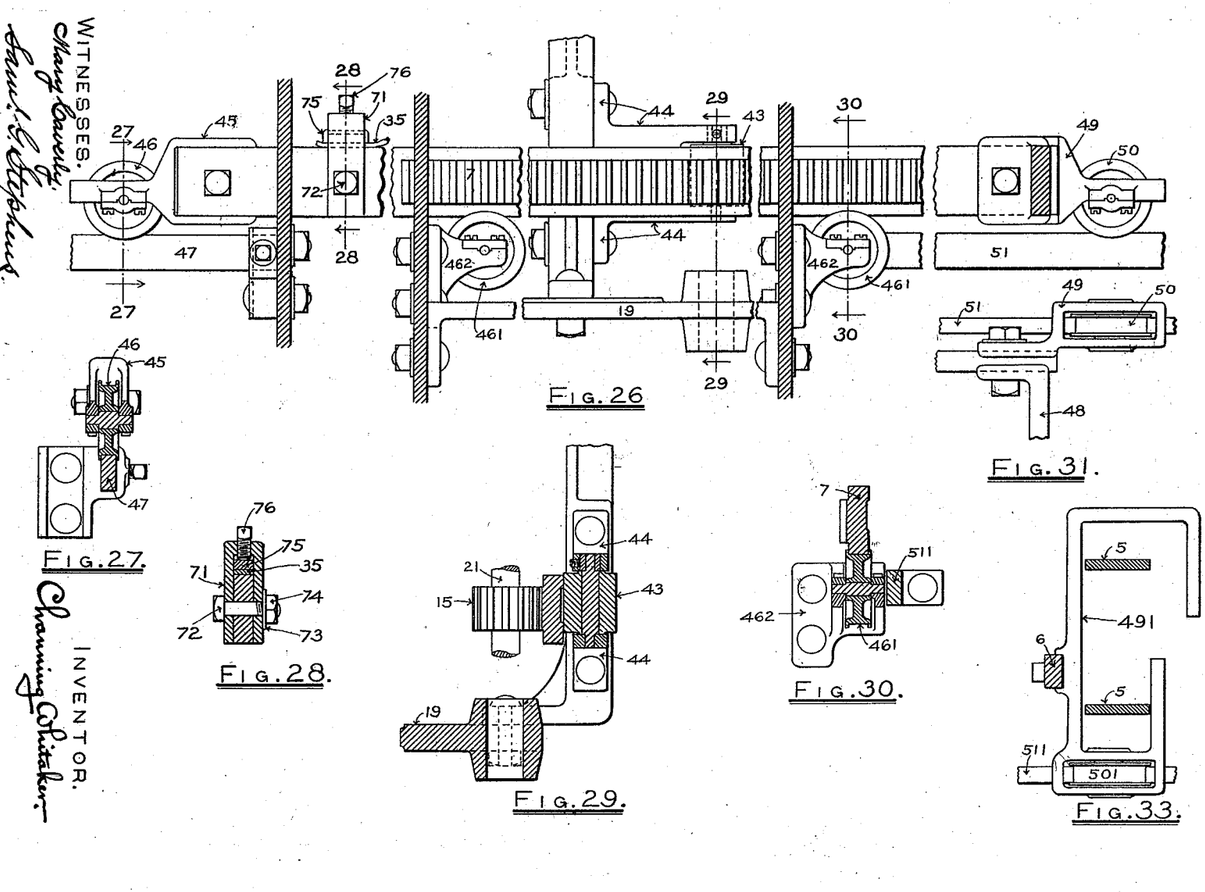
Fig. 26, Sheet 9, is a view, partly in vertical section, but mainly in side elevation, showing the cone-rack and certain of the parts which are applied thereto and others that are adjacent thereto.
Fig. 27, Sheet 9, is a detail view in vertical section on line 27 27 of Fig. 26.
Fig. 28, Sheet 9, is a similar view in vertical section on line 28 28 of Fig. 26.
Fig. 29, Sheet 9, is a similar view in vertical section on line 29 29 of Fig. 26.
Fig. 30, Sheet 9, is a similar view in vertical section on line 30 30 of Fig. 26.
Fig. 31, Sheet 9, is a detail view showing in plan the right-hand end of the cone-rack in Fig. 26 and certain additional parts.
Fig. 33, Sheet 9, is a view in horizontal section on line 33 33 of Fig. 32.

Figs. 26 and 28, Sheet 9, show one end of band 35 connected with the cone-rack by means of a saddle 71, the sides of which pass down against the sides of the cone-rack and are secured to the latter by a bolt 72, provided with a washer 73 and nut 74. Through a threaded hole in the upper part of the saddle passes a screw 76, which bears by its end against a block 75, between which last and the upper edge of the cone-rack the end of band 35 is placed and clamped.

The operation whereby the cone-rack is returned to its starting position in the fly-frame, after one set of bobbins has been filled and it is desired to prepare for beginning to wind roving upon a new set of bobbins, is commonly termed "winding up." The said operation always has been performed by hand heretofore, so far as I am aware, the wind-up shaft being rotated by hand for the purpose, and serving to actuate the cone-rack through the usual gearing by which it is connected with the cone-rack.

I have shown in the accompanying drawings means of automatically effecting the return of the cone-rack—that is to say, the wind-up—through the agency of a device which itself is wound up or set during the regular movements of the machine occurring as the bobbins fill with roving, and which device, when permitted to act, will unwind and slide the rack back to the starting position thereof. Such a device is constituted by the arrangement which I have presented herein as having the function of taking up backlash and preventing lost motion in consequence of the backlash. In the case of the said arrangement, as the rack is advanced during the regular working of the fly-frame, the weight 29, Figs. 1 and 20, is raised. When the weight 29 is thus raised, its gravity will enable it to slide the rack backward to its starting position in the fly-frame, after a break or disconnection has been made in the gearing intermediate the tumbling-shaft 10 and the cone-rack. The movement of the cone-rack that is thus occasioned by the action of the weight 29 may be regulated by the operative, who will grasp the hand-wheel 27 on the wind-up shaft 22 and allow it to slip or move through his hands, as he may see fit.

The foregoing is to be understood as being only one form of the devices that I contemplate employing for effecting automatically the return of the rack. I have contemplated carrying out the broad idea by various devices and arrangements. I prefer to provide an automatic regulator which shall operate to protect against too rapid a return movement of the cone-rack, and also to prevent too sudden stoppage of the said return movement. Various known forms of checks, among which may be specified frictional and air checks, are suitable for the purpose and may be employed. In the drawings, I have shown a checking device or regulator consisting of a case 36, Figs. 1 and 20, in which the weight 29 is arranged to slide up and down, the weight being nearly equal in diameter to the interior of the casing. Through the casing 36, near the lower end thereof, a series of holes or air-vents 361 is formed. The weight 29 acts as a piston within the casing 36, and when the said weight 29 is permitted to descend, as in effecting the return of the cone-rack, it compresses the air beneath it in the casing. The compressed air serves as a cushion, and retards the descent of the weight, permitting it to sink gradually as the air escapes at the sides of the weight and through the holes 361. The lower end of the casing 36 fits in a depression in a plate 37, (see Fig. 25, Sheet 8,) which is held by bolts 38 to the brackets 39 on the machine-framing. The upper end of the casing 36 fits within a hole in a plate 40, (see Figs. 23 and 24, Sheet 8,) that is held by bolts 41 41 to brackets 42 42, attached to the machine-framing. The holes that are made in the brackets 39 39 42 42 for the bolts 38 38 41 41 are elongated, as shown in Fig. 23, in order to permit of adjustment of casing 36.

In order to prevent the cone-rack from springing away from its actuating-pinion 15, in consequence of the pressure that is exerted thereagainst when the said pinion acts to move the cone-rack, or from other causes, I employ a roller 43, Figs. 26 and 29, Sheet 9, which is in contact with the cone-rack adjacent to the point at which the pinion meshes with the cone-rack, but is located on the side of the cone-rack which is opposite to the side thereof on which the pinion 15 is located. The said roller is mounted, with its axis arranged vertically, in a supporting frame or bracket 44, that is suitably supported on the machine-framing.

With the object in view of preventing the cone-rack from sticking, and of enabling the same to be moved endwise in the machine smoothly and with the application of a small amount of power, I employ in connection with the cone-rack a series of wheels or rollers for supporting and guiding the same. I also provide for supporting in a novel manner the belt-guide, which latter usually is so mounted on the cone-rack that the main portion thereof projects laterally from the cone-rack and by its weight tends to turn or twist the cone-rack, causing the latter to bind in its guides. Thus the end of the cone-rack 7 opposite to that which carries the belt-guide 6 has secured thereto a small frame or bracket 45, Fig. 1, Sheet 1, and Figs. 26 and 27, Sheet 9, having journaled therein a flanged wheel 46, which runs on a rail 47, forming part of the machine-framing, and herein shown as located directly underneath the cone-rack. The intermediate portions of the cone-rack rest upon flanged wheels 461 461, Fig. 26, Sheet 9, that are journaled in brackets 462 462, (see also Fig. 30, Sheet 9,) secured to convenient portions of the machine-framing.

Figure 32:
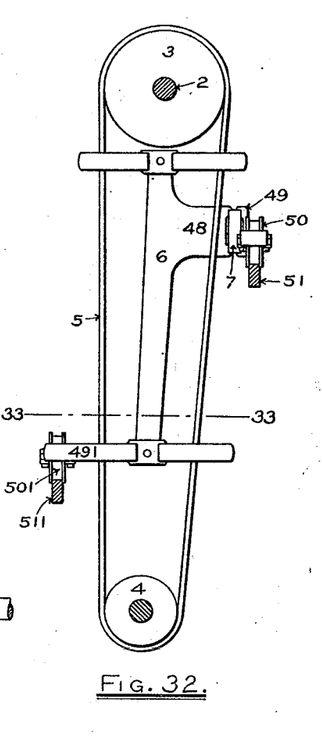
Fig. 32, Sheet 2, is a view taken from the right-hand side of Fig. 1ᵃ, same sheet.

To the end of the cone-rack which carries the belt-guide 6 there is bolted a laterally-projecting frame or bracket 49, (see Fig. 31, Sheet 9, and Fig. 32, Sheet 2,) in which is journaled the flanged wheel 50, which runs upon a rail 51, located in a vertical plane a little to one side of the plane passing vertically through the cone-rack. The arm 48 of the belt-guide 6 is bolted to the cone-rack on the side of the latter opposite to that on which the frame 49 is affixed. The outwardly-projecting part of the belt-guide 6 is formed for the support of a flanged wheel 501, the said wheel preferably being journaled in one end of the lower loop 491 of the belt-guide and in a small addition formed on the said loop, as clearly shown in Fig. 33, Sheet 9. The wheel 501 runs upon a rail 511, provided in the machine-framing. (See Fig. 33, Sheet 9, and Fig. 32, Sheet 2.) By means of rail 511 and wheel 501 the belt-guide is supported at the outer laterally-projecting extremity thereof, and thereby the weight of the belt-guide is prevented from acting to turn or twist the cone-rack, as aforesaid, and as heretofore it usually has been permitted to do. As will be observed, the rails 51 and 511 are located on opposite sides of the cone-rack and belt-guide.

Having thus described my invention and the best means of reducing the same to practice which I have thus far devised, I would have it understood that I lay no claim herein to the means of obviating backlash and of automatically effecting the wind up. These have been made the subject of claim in a divisional application filed by me December 9, 1895, Serial No. 571,556.

I claim herein as my invention—

1. The combination with a cone-rack, of a wind-up shaft normally disconnected from the cone-rack, and means through which the said shaft may be operatively connected with the cone-rack when desired, substantially as described.

2. The combination with the cone-rack, the wind-up shaft, and a wind-up gear, of means for maintaining normally a break or disconnection in the connections between the wind-up shaft and cone-rack and thus leaving the cone-rack free to move independently of the wind-up shaft, substantially as described.

3. The combination with the cone-rack, a movable wind-up shaft, and a wind-up gear, of means whereby the shaft is maintained normally in position to occasion a break or disconnection in the connections between the wind-up shaft and cone-rack and thus leave the cone-rack free to move independently of the wind-up shaft, substantially as described.

4. The combination with the cone-rack, of a movable wind-up shaft having a wind-up gear fast thereon, normally occupying a position which separates or disconnects the gear from the cone-rack, thereby leaving the cone-rack free to move independently of the wind-up shaft, substantially as described.

5. The combination with the cone-rack, the vertically-movable wind-up shaft, and a wind-up gear fast thereon, of means whereby the shaft is held raised normally with its gear disconnected from the cone-rack, substantially as described.

6. The combination with the cone-rack, the vertically-movable wind-up shaft, and a wind-up gear fast thereon, of an overbalanced lever whereby the shaft is held raised normally with its gear disconnected from the cone-rack, substantially as described.

7. The combination with the cone-rack, gearing for intermittingly moving said cone-rack, a shaft or spindle mounted in bearings in which it is free to rotate and to move lengthwise, and devices operated by said shaft as it is moved lengthwise and serving to move a part of said gearing into and out of operative relations with the other part, substantially as described.

8. The combination with the cone-rack, the tumbling-shaft, and a motion-transmitting train intermediate the cone-rack and the tumbling-shaft, of a wind-up shaft normally disconnected from the cone-rack, means whereby it may be operatively connected with the cone-rack when required, and means whereby, when the wind-up shaft is operatively connected with the cone-rack, a break or disconnection is produced in the said transmitting-train, substantially as described.

9. The combination with the cone-rack, the tumbling-shaft, a motion-transmitting train between the cone-rack and the tumbling-shaft, a movable wind-up shaft having a wind-up gear and occupying normally a position that maintains a break or disconnection in the connections which leaves the cone-rack free to move independently of the wind-up shaft, and means whereby, when the wind-up shaft is moved into position to establish connections with the cone-rack, a break or disconnection is produced in the said motion-transmitting train, substantially as described.

10. The combination with the cone-rack, the tumbling-shaft, a motion-transmitting train between the cone-rack and the tumbling-shaft, and a movable wind-up shaft having a wind-up gear fast thereon and occupying normally a position which separates or disconnects the wind-up gear from the cone-rack, of means whereby simultaneously with the movement of the wind-up shaft which places the wind-up gear in mesh with the cone-rack, a break or disconnection is produced in the said motion-transmitting train, substantially as described.

11. The combination with the cone-rack, the tumbling-shaft, a motion-transmitting train between the cone-rack and the tumbling-shaft, a vertically-movable wind-up shaft, and a wind-up gear fast thereon, of means whereby normally the wind-up shaft is held in position to separate or disconnect the wind-up gear from the cone-rack, and whereby, when the wind-up shaft is moved vertically into position to place the wind-up gear in mesh with the cone-rack, a break or disconnection is produced in the said motion-transmitting train, substantially as described.

12. The combination with the cone-rack, the tumbling-shaft, a sliding pinion mounted thereon, a motion-transmitting train between the said pinion and the cone-rack, the wind-up shaft normally disconnected from the cone-rack, and means through which the wind-up shaft may be operatively connected with the cone-rack when required, of means whereby, when operative connection is established between the wind-up shaft and the cone-rack, the sliding pinion is moved upon the tumbling-shaft out of mesh with the gear engaged thereby in the motion-transmitting train, substantially as described.

13. The combination with the cone-rack, the tumbling-shaft, a sliding pinion mounted thereon, a motion-transmitting train between the said pinion and the cone-rack, and a movable wind-up shaft having a wind-up gear and occupying normally a position that maintains a break or disconnection in the connections between the wind-up shaft and the cone-rack which leaves the cone-rack free to move independently of the wind-up shaft, of means whereby, when the wind-up shaft is moved into position to establish connections with the cone-rack, the sliding pinion is moved upon the tumbling-shaft out of mesh with the gear engaged thereby in the motion-transmitting train, substantially as described.

14. The combination with the cone-rack, the tumbling-shaft, a sliding pinion mounted thereon, a motion-transmitting train between the said pinion and the cone-rack, a vertically-movable wind-up shaft, and a wind-up gear fast thereon, of means whereby normally the wind-up shaft is held in position to separate or disconnect the wind-up gear from the cone-rack, and whereby, when the wind-up shaft is moved into position to place the wind-up gear in mesh with the cone-rack the sliding pinion is moved upon the tumbling-shaft out of mesh with the gear engaged thereby in the motion-transmitting train, substantially as described.

15. The combination with the cone-rack, the tumbling-shaft, a sliding pinion mounted thereon, a motion-transmitting train between the said pinion and the cone-rack, a vertically-movable wind-up shaft, and a wind-up gear fast thereon, of a lever engaging by one arm thereof the said sliding pinion, and, by another arm thereof engaging with the wind-up shaft, substantially as described.

16. The combination with the cones, the cone-belt, the cone-belt guide, the cone-rack, and rack-advancing devices, of means for simultaneously shipping or disconnecting the said devices to render them inoperative to advance the cone-rack and raising the bottom cone to slacken the cone-belt, substantially as described.

17. The combination with the cones, the cone-belt, the cone-belt guide, the cone-rack, and rack-advancing devices, of a lever arrangement for simultaneously shipping or disconnecting the said devices to render them inoperative to advance the cone-rack and lifting the bottom cone to slacken the cone-belt, substantially as described.

18. The combination with the cones, the cone-belt, the cone-belt guide, the cone-rack, rack-advancing devices, a wind-up shaft normally disconnected from the cone-rack, and means through which said shaft may be operatively connected with the cone-rack when required, of means whereby, when said shaft is placed in operative connection with the cone-rack, the said devices will be shipped or disconnected to render them inoperative to advance the cone-rack and the bottom cone lifted to slacken the cone-belt, substantially as described.

19. The combination with the cones, the cone-belt, the cone-belt guide, the cone-rack, rack-advancing devices, and a movable wind-up shaft having a wind-up gear and occupying normally a position that maintains a break or disconnection in the connections which leaves the cone-rack free to move independently of the wind-up shaft, of means whereby, when the said shaft is moved into position to establish connections with the cone-rack, the said devices will be shipped or disconnected to render them inoperative to advance the cone-rack and the bottom cone will be lifted to slacken the cone-belt, substantially as described.

20. The combination with the cones, the cone-belt, the cone-belt guide, the cone-rack, rack-advancing devices, and a movable wind-up shaft having a wind-up gear thereon and normally occupying a position which separates or disconnects the said gear from the cone-rack, of means whereby, when said wind-up shaft is moved to place the wind-up gear in mesh with the cone-rack, the said devices will be shipped or disconnected to render them inoperative to advance the cone-rack and the bottom cone will be lifted to slacken the cone-belt, substantially as described.

21. The combination with the cones, the cone-belt, the cone-belt guide, the cone-rack, rack-advancing devices, and a vertically-movable wind-up shaft having a wind-up gear fast thereon, and normally occupying a position which separates the said gear from the cone-rack, of means whereby, when the wind-up shaft is moved vertically to place the wind-up gear in mesh with the cone-rack, the said devices will be shipped or disconnected to render them inoperative to advance the cone-rack and the bottom cone will be lifted to slacken the cone-belt, substantially as described.

22. The combination with the cones, the cone-belt, the cone-belt guide, the cone-rack, rack-advancing devices, and a movable wind-up shaft having a wind-up gear thereon and normally occupying a position which separates or disconnects the said gear from the cone-rack, of a lever arrangement whereby, when said wind-up shaft is moved to place the wind-up gear in mesh with the cone-rack, the said devices will be shipped or disconnected to render them inoperative to advance the cone-rack and the bottom cone will be lifted to slacken the cone-belt, substantially as described.

23. The combination with the cones, the cone-belt, the cone-belt guide, the cone-rack, rack-advancing devices, and a vertically-movable wind-up shaft having a wind-up gear fast thereon, and normally occupying a position which separates the said gear from the cone-rack, of a lever arrangement whereby, when the wind-up shaft is moved vertically to place the wind-up gear in mesh with the cone-rack, the said devices will be shipped or disconnected to render them inoperative to advance the cone-rack and the bottom cone will be lifted to slacken the cone-belt, substantially as described.

24. The combination with the cone-rack, and a laterally-projecting belt-guide carried thereby, of a guide borne upon by the extended portion of the cone-belt guide and sustaining the weight of such portion as the cone-rack moves, substantially as described.

25. The combination with the cone-rack, and a laterally-projecting belt-guide carried thereby, of guide-rails at the front and rear of the cone-rack, and wheels which roll upon the said guide-rails and thereby sustain the weight of the moving parts at points adjacent to the cone-rack and at the lateral extremity of the belt-guide, substantially as described.

26. The combination with the cone-rack, and a laterally-projecting belt-guide carried thereby, of guide-rails at the front and rear of the cone-rack, a bracket or stand affixed to the cone-rack and provided with a wheel which rolls along one of the said guide-rails, and a wheel carried by the extended portion of the belt-guide and rolling along the other guide-rail, substantially as described.

27. The combination with the cone-rack, a bracket or stand applied to one end thereof and provided with a wheel, a rail in line with the cone-rack and on which said wheel rolls, wheels supporting intermediate portions of the cone-rack, guide-rails at the front and rear of the cone-rack adjacent to the other end of the latter, a bracket or stand affixed to the latter end of the cone-rack and provided with a wheel which rolls along one of the said guide-rails, and a wheel carried by the extended portion of the belt-guide and rolling along the other guide-rail, substantially as described.

In testimony whereof I affix my signature in presence of two witnesses.

CHANNING WHITAKER.

Witnesses:
MARY CAVERLY,
SAML. G. STEPHENS.